United States Patent
Tannenbaum et al.

(10) Patent No.: US 10,452,963 B2
(45) Date of Patent: Oct. 22, 2019

(54) ARMING AND/OR ALTERING A HOME ALARM SYSTEM BY SPECIFIED POSITIONING OF EVERYDAY OBJECTS WITHIN VIEW OF A SECURITY CAMERA

(71) Applicant: Google Inc., Mountain View, CA (US)

(72) Inventors: Harry Tannenbaum, San Francisco, CA (US); Shayan Sayadi, Mill Valley, CA (US)

(73) Assignee: GOOGLE LLC, Mountain View, CA (US)

( * ) Notice: Subject to any disclaimer, the term of this patent is extended or adjusted under 35 U.S.C. 154(b) by 140 days.

(21) Appl. No.: 15/489,424

(22) Filed: Apr. 17, 2017

(65) Prior Publication Data

US 2017/0330060 A1 Nov. 16, 2017

Related U.S. Application Data

(60) Provisional application No. 62/335,604, filed on May 12, 2016.

(51) Int. Cl.
| | |
|---|---|
| *G06K 9/62* | (2006.01) |
| *G06K 9/66* | (2006.01) |
| *G06K 9/00* | (2006.01) |
| *G06K 9/46* | (2006.01) |
| *G08B 25/00* | (2006.01) |

(Continued)

(52) U.S. Cl.
CPC .............. *G06K 9/66* (2013.01); *G06K 9/00* (2013.01); *G06K 9/00771* (2013.01); *G06K 9/4604* (2013.01); *G06K 9/6202* (2013.01); *G06T 7/254* (2017.01); *G08B 25/008* (2013.01); *G06T 2207/10016* (2013.01); *G06T 2207/10024* (2013.01); *G06T 2207/20081* (2013.01); *G06T 2207/30196* (2013.01); *G06T 2207/30232* (2013.01); *G08B 13/19656* (2013.01); *G08B 19/005* (2013.01)

(58) Field of Classification Search
CPC ........... G06T 7/254; G06T 2207/10016; G06T 2207/10024; G06T 2207/20081; G06T 2207/30196; G06T 2207/30232; G06K 9/00771; G06K 9/4604; G06K 6/6202; G08B 25/008; G08B 13/19656; G08B 19/005
USPC ........................................................ 382/103
See application file for complete search history.

(56) References Cited

U.S. PATENT DOCUMENTS

| | | | | |
|---|---|---|---|---|
| 6,297,844 B1 * | 10/2001 | Schatz | ............... | G06K 9/00771 |
| | | | | 348/43 |
| 6,504,479 B1 | 1/2003 | Lemons et al. | | |

(Continued)

FOREIGN PATENT DOCUMENTS

| | | |
|---|---|---|
| CN | 101631236 B | 7/2011 |
| CN | 101882353 B | 7/2012 |

*Primary Examiner* — Jonathan S Lee
(74) *Attorney, Agent, or Firm* — Morris & Kamlay LLP

(57) ABSTRACT

A method and system for controlling a home security system. A processor may be trained to recognize an image standard for a scene, wherein the training comprises creating a profile of the image standard. Operational imaging of the scene may be performed to create an operational image. A profile of the operational image may be created. Profiles of the image standard and the operational image may be compared. A state of a security system may be changed as a result of a comparison of the profiles of the image standard and the operational image.

20 Claims, 11 Drawing Sheets

(51) Int. Cl.
*G06T 7/254* (2017.01)
*G08B 13/196* (2006.01)
*G08B 19/00* (2006.01)

(56) References Cited

U.S. PATENT DOCUMENTS

| | | | |
|---|---|---|---|
| 6,687,402 B1* | 2/2004 | Taycher | G06K 9/6204 |
| | | | 382/199 |
| 6,970,183 B1 | 11/2005 | Monroe | |
| 9,659,483 B2* | 5/2017 | Sager | H04Q 9/00 |
| 9,960,929 B2* | 5/2018 | Fadell | H04L 12/2816 |
| 2013/0216094 A1* | 8/2013 | DeLean | G06K 9/00335 |
| | | | 382/103 |
| 2014/0037143 A1* | 2/2014 | Fan | G08B 13/196 |
| | | | 382/103 |
| 2015/0102922 A1* | 4/2015 | Witmer | G08B 13/00 |
| | | | 340/527 |
| 2015/0309487 A1* | 10/2015 | Lyman | H04L 12/2827 |
| | | | 700/275 |
| 2016/0189527 A1* | 6/2016 | Peterson | G08B 25/008 |
| | | | 340/541 |
| 2016/0203700 A1* | 7/2016 | Bruhn | G08B 25/008 |
| | | | 340/506 |
| 2017/0255833 A1* | 9/2017 | Guerzoni | G08B 13/19606 |

\* cited by examiner

ARMING AND/OR ALTERING A HOME ALARM SYSTEM BY SPECIFIED POSITIONING OF EVERYDAY OBJECTS WITHIN VIEW OF A SECURITY CAMERA

This application claims the benefit of U.S. Provisional Application No. 62/335,604 filed on May 12, 2016.

BACKGROUND

Automated systems that secure a premises typically require deliberate user action to arm, disarm, or otherwise control the system. A home security system, for example, generally requires a user to arm the system by going to a control panel and pressing one or more buttons. Disarming the security system likewise requires the user to interact with the control panel.

This can be a nuisance to the user, and represents yet another step the user must add to his routine when leaving the house. In addition to gathering his belongings, taking his keys, and locking the door, he must now also pause at the control panel and press one or more buttons to activate the alarm system. Upon returning home, he must unlock the door, enter, then recall and enter a security code at the control panel. While this process may be burdensome, the alternative is to not use the security system at all, which would leave the home vulnerable.

BRIEF SUMMARY

According to an embodiment of the disclosed subject matter, a method and system are disclosed herein for controlling a home security system. A processor may be trained to recognize an image standard for a scene, wherein the training comprises creating a profile of the image standard. Operational imaging of the scene may be performed to create an operational image. A profile of the operational image may be created. Profiles of the image standard and the operational image may be compared. The image standard may include an image of an object that is not present in the operational image. Alternatively, the operational image may include an image of an object that is not present in the image standard.

A state of a security system may be changed as a result of a comparison of the profiles of the image standard and the operational image. The changing of the state of the security system may comprise one of setting (i.e., arming) an alarm, resetting (i.e., disarming) the alarm, and asserting the alarm.

The training may comprise: acquiring the image standard of the scene; performing pre-processing of the image standard; performing feature extraction on the pre-processed image standard; performing segmentation of the extracted features of the pre-processed image standard; and creating the profile of the image standard based on the segmented extracted features. Each of the profile of the image standard and the profile of the operational image may comprise identifications of extracted features from the respective image standard and the operational image. Each of the profile of the image standard and the profile of the operational image may comprise data relating to each feature in the respective image standard and the operational image, wherein the data relates to one or more of: feature type, feature size, feature location, and feature color.

The comparing of the profiles may comprise comparing data in the profile of the image standard with corresponding data in the profile of the operational image to determine if one or more resulting differences exceeds one or more corresponding respective threshold values. The state of the security system may be changed when at least one of the resulting differences exceeds at least one of the corresponding respective threshold values. The comparing of the profiles may comprise an application of fuzzy logic to determine one or more resulting resulting differences.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

A method and system are disclosed herein for controlling a home security system. A processor may be trained to recognize an image standard for a scene, wherein the training comprises creating a profile of the image standard. Operational imaging of the scene may be performed to create an operational image. A profile of the operational image may be created. Profiles of the image standard and the operational image may be compared. The image standard may include an image of an object that is not present in the operational image. Alternatively, the operational image may include an image of an object that is not present in the image standard. A state of a security system may be changed as a result of a comparison of the profiles of the image standard and the operational image. The changing of the state of the security system may comprise one of setting (i.e., arming) an alarm, resetting (i.e., disarming) the alarm, and asserting the alarm.

In a use case, the user's placement or removal of an everyday object may be used to automatically control a security system. The operation of the system described herein is premised on a correlation between the presence of the object and the presence of the user. A training process trains a system to recognize an image of a standard scene. Such a scene may include, for example, an everyday object in some typical location, such as a laptop computer on a coffee table, a cell phone on an end table, a purse on a kitchen counter, or a coat on a coat rack. Optical recognition of such a scene causes the system to enter or remain in a certain security state. Recognizing a particular object on a table may cause the system to enter or remain in a disarmed, reset condition, under the presumption that the presence of the object coincides with the user being present on the premises. If it is recognized that the scene has changed (if, for example, the object has been removed), then this recognition causes the system to change to a different security state. For example, if the system now sees that the object is no longer present on the table, then a different security state may be entered. The security system may be set into an armed state, for example, under the presumption that the user has left the home as evidenced by the fact that the object has been removed from the scene. If the user returns as evidenced by the appearance of the object in its customary (standard) location, the presence of the object can be observed, causing the system to reset the security system to a disarmed state.

Figure 1A:
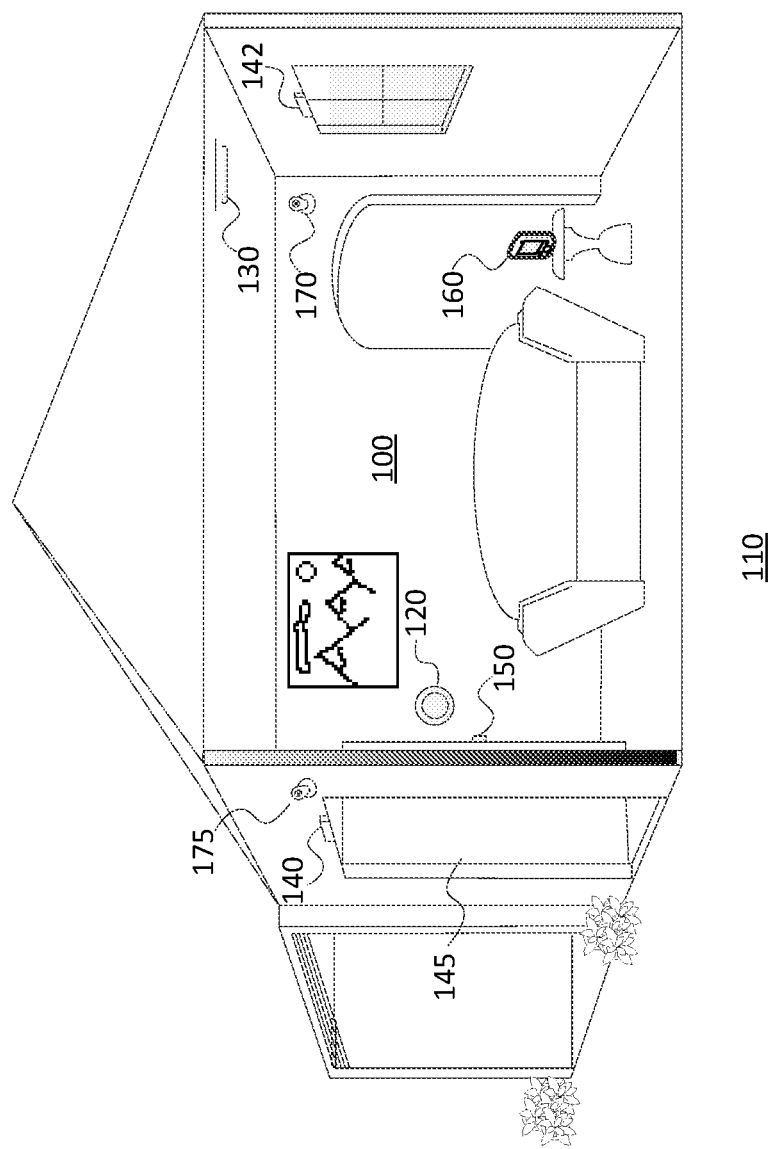
FIG. 1A shows a premises where the systems and methods described herein may be implemented, according to an embodiment of the disclosed subject matter.

FIG. 1A illustrates an exemplary setting for the systems and methods described herein. A room 100 is part of a home 110. The rooms of home 110 may include a number of systems to monitor and manage the security of the home. Room 100, for example, may include a number of sensors, such as sensors 130, 140, 142, 170, and 175. These sensors may detect any of several physical phenomena. Sensor 140 may detect the opening or closing of door 145; sensor 142 may detect the opening or closing of the adjacent window. Sensors 170 and 175 may be cameras that capture images or video. Sensor 130 may be detect the presence of persons, pets, or other objects. Sensors 130, 170, and 175 may detect electromagnetic radiation given off or reflected by a person, for example. The radiation may or may not be in the visible range. Alternatively or in addition, any of the sensors shown here may detect acoustic waves. The data collected by the sensors individually or collectively may be used to determine a security posture of the home 110, e.g, the presence or absence of an intruder. The role of such sensors is describe further below.

In an implementation, one or more sensors (e.g., a camera) may detect the presence of an object, such as cell phone 160, in a particular location, such as the table shown. The presence of phone 160 may be used to infer that the resident of the home is present, so that, for example, a home security system may be automatically disarmed once the phone 160 is placed in its location, i.e., when the user has arrived home. If the phone 160 is removed, e.g., when the user leaves the house, the absence of phone 160 can also be detected. The detection of the phone's absence can therefore be used to infer that the user has left home 110, so that the security system may be automatically armed.

Embodiments disclosed herein may use one or more sensors, e.g., cameras. In general, a sensor may refer to any device that can obtain information about its environment. Sensors may be described by the type of information they collect. For example, sensor types as disclosed herein may detect motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a sensor as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 1B:
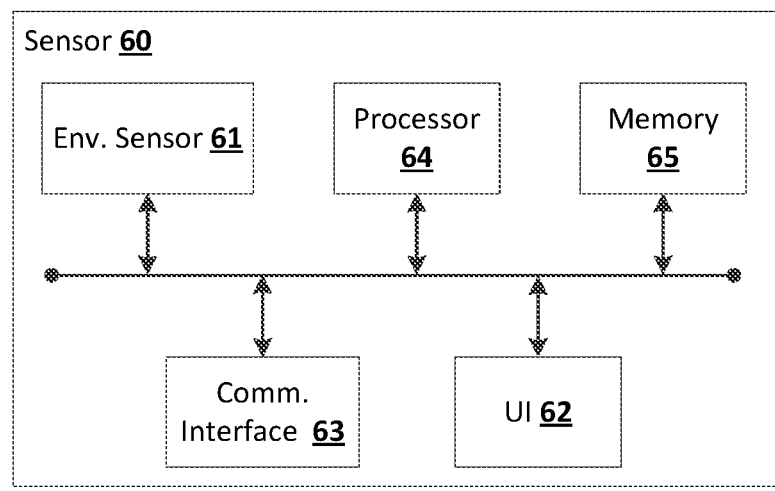
FIG. 1B shows a block diagram of a sensor, according to an embodiment of the disclosed subject matter.

Generally, a sensor may include hardware in addition to the specific physical sensor that obtains information about the environment. FIG. 1B illustrates a sensor, according to an implementation. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, camera or other light sensor, humidity sensor, pressure sensor, microphone, or any other suitable environmental sensor, that obtains a corresponding type of information about the environment in which the sensor 60 is located.

A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a wi-fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the components shown.

Figure 2:
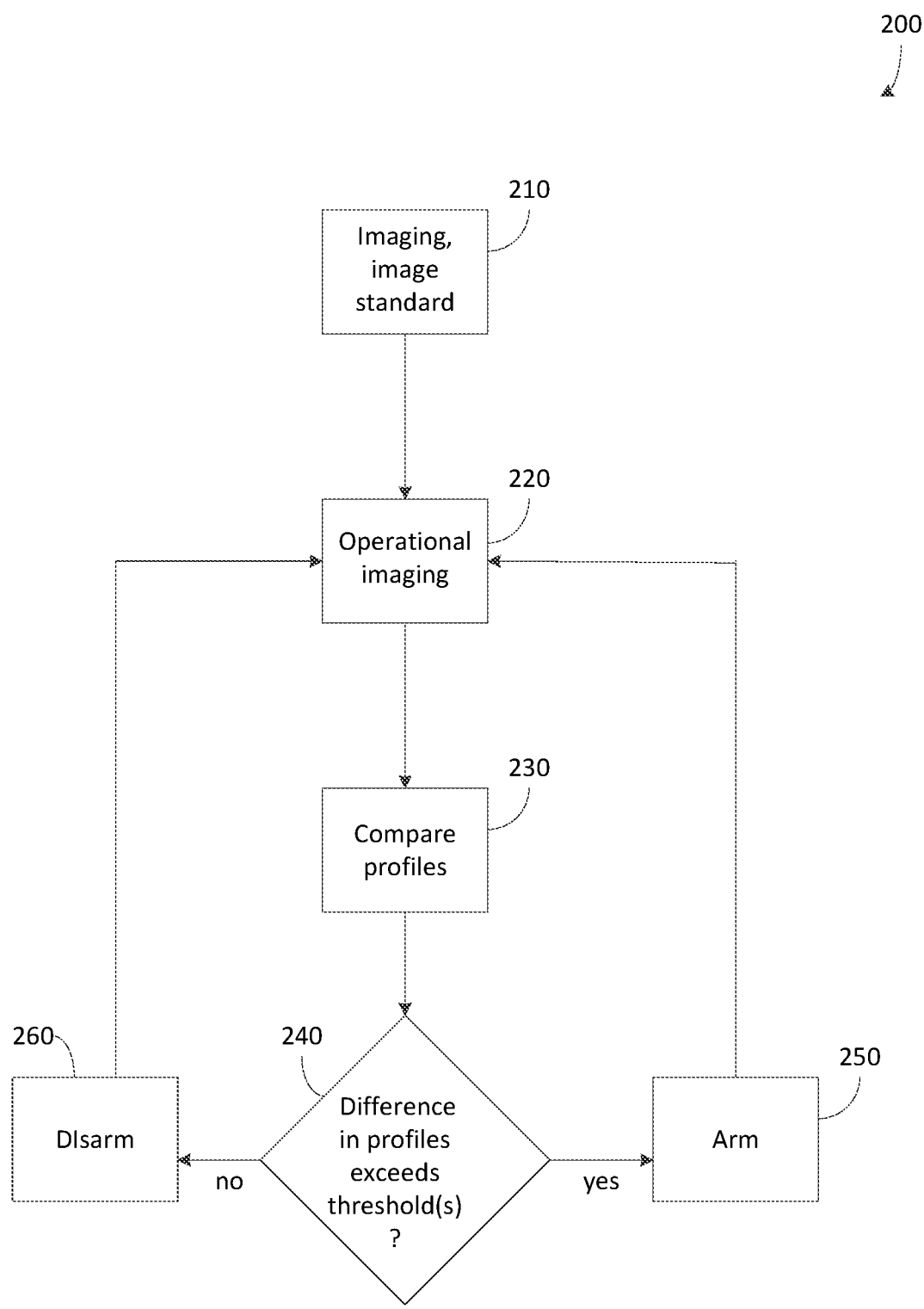
FIG. 2 is a flowchart illustrating the processing performed by an embodiment of the disclosed subject matter.

Processing of the systems and components described herein is illustrated in FIG. 2 according to an implementation. The choice of a particular object and location may be user defined; once this choice has been made, the training as described herein may proceed. At 210, imaging may be performed for the scene to be used as an image standard. This allows the system to be trained to recognize a particular image or an acceptable variant thereof. As discussed with respect to the example of FIG. 1, an object (such as cell phone 160) may be placed on a table by a user. The presence of this object may be used to change the state of the home security system, e.g., disarm the security system. The presence of the object may be detected through imaging, using a sensor (such as a camera) and related processing logic. At 210 of FIG. 2, this logic may be trained to recognize the presence of the object. To do this, an image of the object in a particular location may be captured, and a profile of this image may be created. In an implementation, this profile identifies various features and parameters of the image. This image may be characterized as an image standard.

At 220, operational imaging may take place. Here, the system described herein may be used operationally. In particular, an image may be captured, where the image either contains or does not contain the object. As discussed generally above (and discussed further below), the presence or absence of the object may be used to infer the presence of a user, and may therefore alter the state of a home security system (e.g., arm or disarm). A profile may be constructed for the operational image, analogous to the profile created for the image standard.

At 230, the profiles for the image standard and the operational image may be compared. At 240 a determination may be made as to whether difference(s) in the profiles exceed one or more predetermined thresholds. If so, then the operational image is significantly different from the image standard, which contains the object. It may therefore be inferred that the object has been removed, and more generally that the user has left (or is about to leave) the home. If this is the case, as evidenced by the differences between the operation image and the standard image profiles, then at 250 the state of the security system may be changed, e.g., the security system may be armed (set), or remain in that condition. Otherwise, the system may enter or remain in a disarmed (reset) state. Operational imaging may continue at 220.

Figure 3:
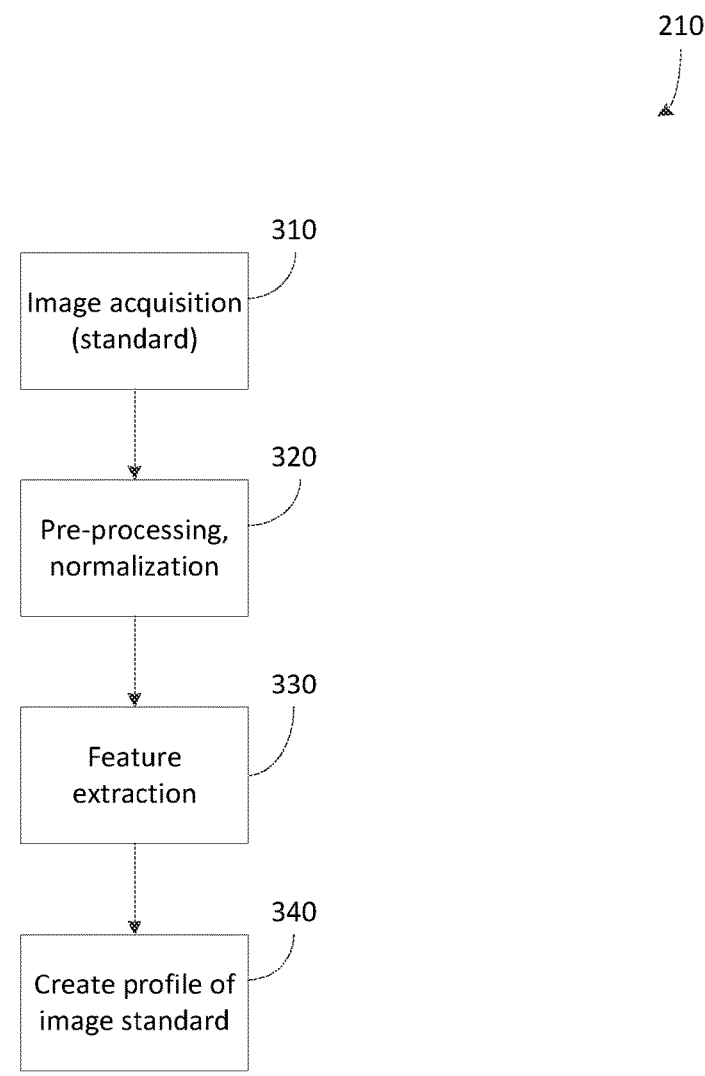
FIG. 3 is a flowchart illustrating an imaging process for a image standard, according to an embodiment of the disclosed subject matter.

FIG. 3 illustrates the imaging process for the image standard (210, FIG. 2) in greater detail, according to an implementation. This process may be part of a training process in which the system described herein learns to recognize a scene represented by the image standard. At 310, the scene is captured for use as the image standard. The image standard may be a digital image is produced by one or several sensors, e.g., image sensors or cameras. The resulting image data may be a 2D image, a 3D volume, or an image sequence. The pixel values typically correspond to light intensity in one or several spectral bands (gray images or color images), but can also be related to various physical measures, such as depth, absorption or reflectance.

At 320-340, several actions may be taken in order to characterize the image standard for purposes of profile creation. At 320, pre-processing may take place. To extract specific information, it can be helpful to pre-process the data in order to assure that it satisfies certain assumptions implied by the subsequent processing. Examples may include (but are not limited to) the following:

Re-sampling, to assure that the image coordinate system is correct.

Noise reduction, to assure that sensor noise does not introduce false information.

Contrast enhancement, to assure that relevant information can be detected.

Scale space representation, to enhance image structures at locally appropriate scales.

At 330, feature extraction may be performed. Image features at various levels of complexity may be extracted from the image data. Examples of such features may include lines, edges, vertices, and ridges. Other examples may include localized points such as corners, blobs or points. Other features may be related to texture, shape or motion. Moreover, information about some or all of these features may be collected, such as a location of a feature in the image and/or relative to other features, or intensity and/or color coordinates of one or more pixels in the feature.

Figure 4:
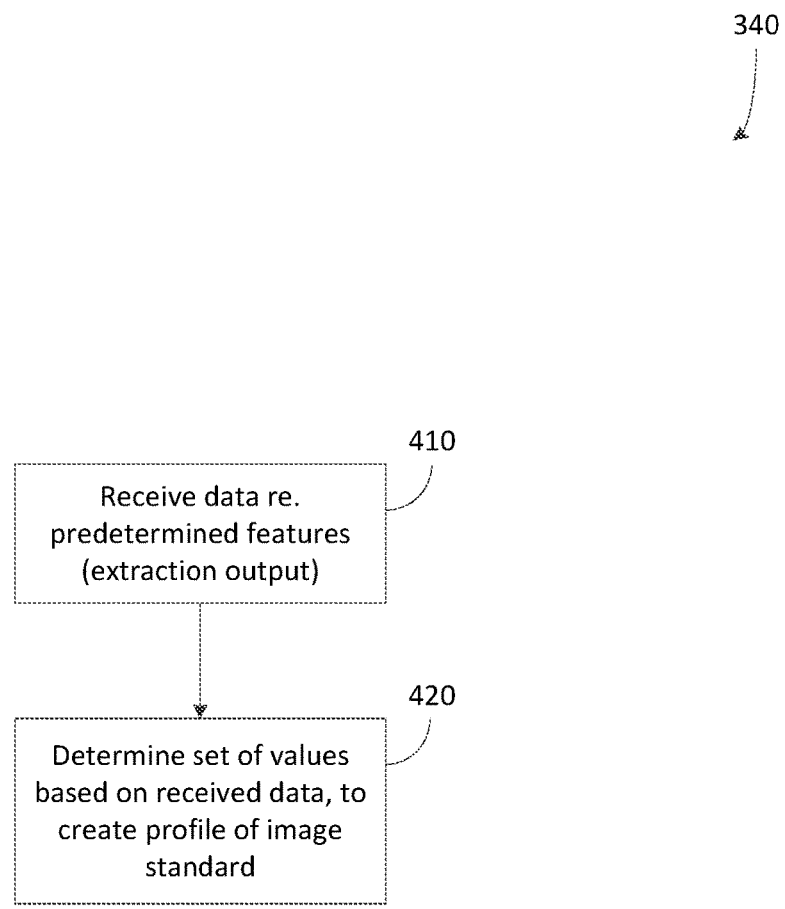
FIG. 4 is a flowchart illustrating profile creation for an image standard, according to an embodiment of the disclosed subject matter.

At 340, a profile for the image standard may be created, using some or all of the information collected at feature extraction 330. Profile creation is illustrated further in FIG. 4. At 410, the collected information is received from the feature extraction process 330. In an implementation, a predetermined subset of the collected information is used, e.g., all edges and vertices. At 420, data related to these features may be compiled and organized into a profile. For example, each feature may be assigned an identifier that serves as an index in a data structure, where the data related to the feature may also be stored. Such data may include the feature's type (edge, vertex, etc.), its size, and/or its location relative to the overall image and/or to other features. Other data may include intensity and color coordinate values of pixels of the feature, for example.

Figure 5:
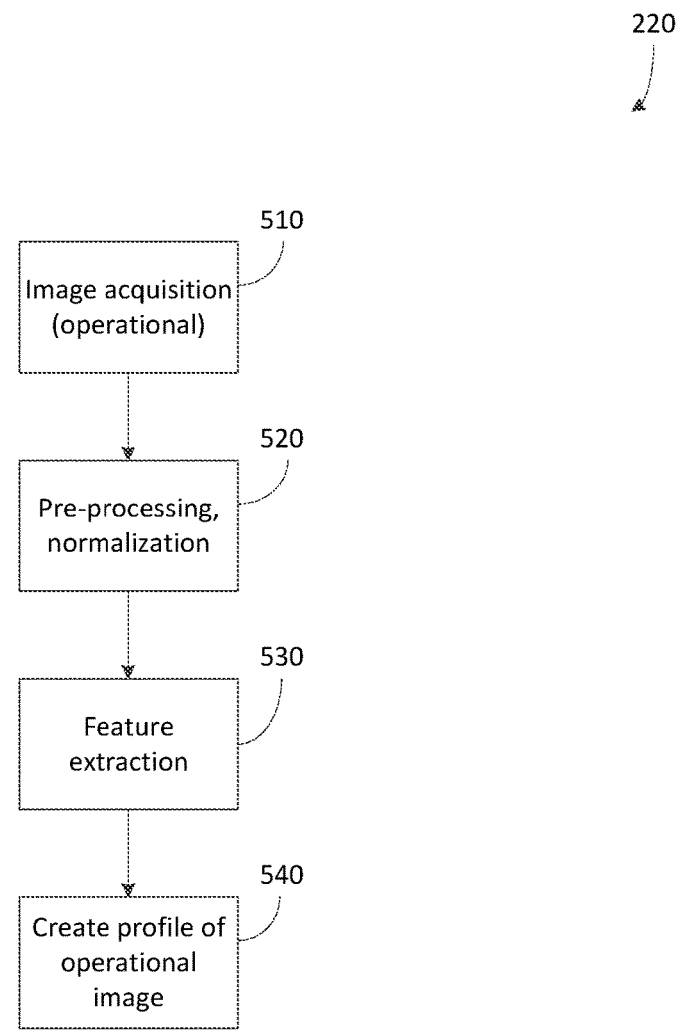
FIG. 5 is a flowchart illustrating an operational imaging process, according to an embodiment of the disclosed subject matter.

FIG. 5 illustrates the processing of operational imaging (220 of FIG. 2). At 510, an operational image is captured. The operational image may be a digital image is produced by one or several sensors, e.g., image sensors or cameras. As in the case of the image standard, the resulting image data may be a 2D image, a 3D volume, or an image sequence. The pixel values typically correspond to light intensity in one or several spectral bands (gray images or color images), but can also be related to various physical measures, such as depth, absorption or reflectance.

At 520-540, several actions may be taken in order to characterize the operational image for purposes of profile creation. At 520, pre-processing of the captured image may take place. To extract specific information, it can be helpful to pre-process the data in order to assure that it satisfies certain assumptions implied by the subsequent processing. As in the case of the image standard, examples may include (but are not limited to):

Re-sampling, to assure that the image coordinate system is correct.
Noise reduction, to assure that sensor noise does not introduce false information.
Contrast enhancement, to assure that relevant information can be detected.
Scale space representation, to enhance image structures at locally appropriate scales.

At 530, feature extraction may be performed. Image features at various levels of complexity may be extracted from the image data. As in the case of the image standard, examples of such features may include lines, edges, vertices, and ridges. Other examples may include localized points such as corners, blobs or points. Other features may be related to texture, shape or motion. Moreover, information about some or all of these features may be collected, such as a location of a feature in the image and/or relative to other features, or intensity and/or color coordinates of one or more pixels in the feature.

Figure 6:
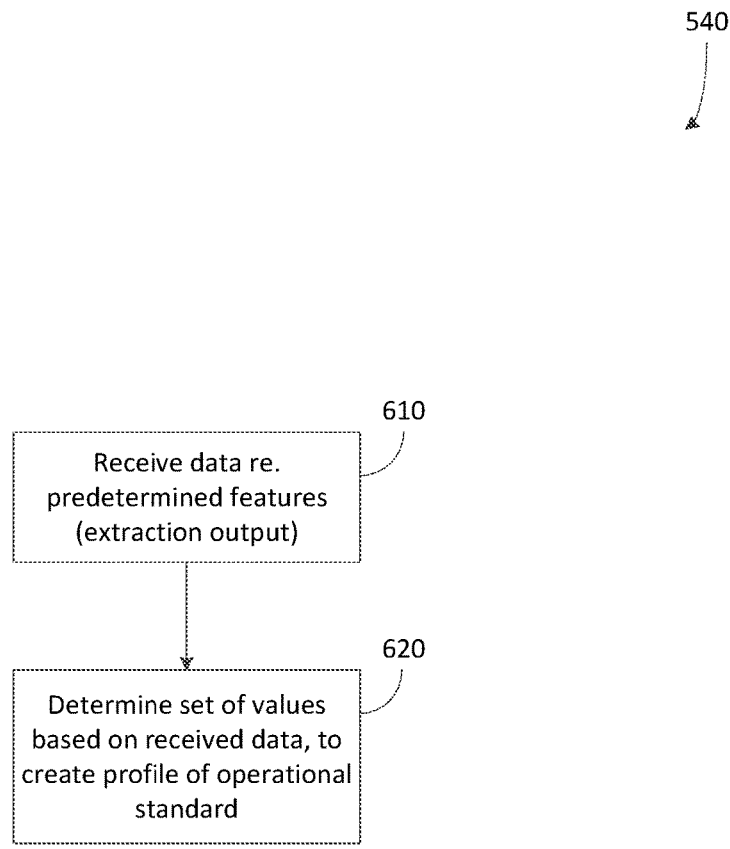
FIG. 6 is a flowchart illustrating profile creation for an operational image, according to an embodiment of the disclosed subject matter.

At 540, a profile for the operational image may be created, using some or all of the information collected at feature extraction 530. Profile creation is illustrated further in FIG. 6. At 610, the collected information is received from the feature extraction process 530. In an implementation, a predetermined subset of the collected information is used, e.g., all edges and vertices. At 620, data related to these features may be compiled and organized into a profile analogous to that of the image standard. For example, each feature may be assigned an identifier that serves as an index in a data structure, where the data related to the feature may also be stored. Such data may include the feature's type (edge, vertex, etc.), its size, shape, and/or its location relative to the overall image and/or to other features. Other data may include intensity and color coordinate values of pixels of the feature.

Note that in an embodiment, multiple image standards may be captured and associated profiles created. In such an implementation, multiple corresponding profiles of such image standards may each be compared to a profile of an operational image at 230 of FIG. 2, so that multiple comparisons are performed. If any of the resulting differences in these comparisons exceeds the threshold(s) (240 of FIG. 2), then a change in the state of the security system may be changed at 250.

Figure 7:
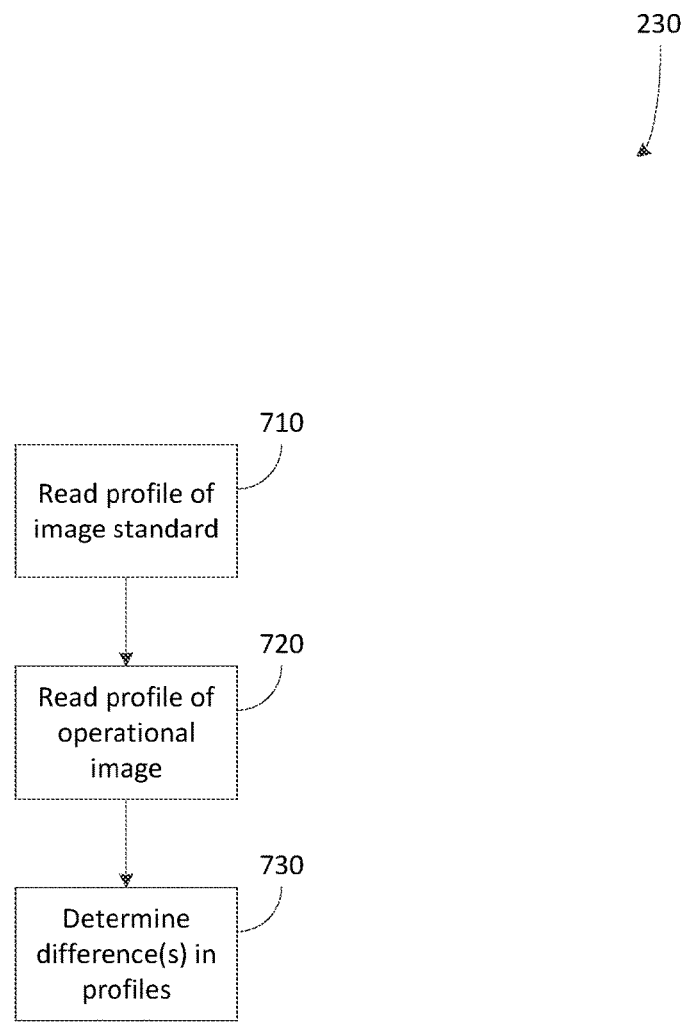
FIG. 7 is a flowchart illustrating image profile comparison, according to an embodiment of the disclosed subject matter.

Profile comparison (230 of FIG. 2) is illustrated in greater detail in FIG. 7, according to an implementation. At 710, the profile of the image standard is read. At 720, the profile of the operational image is read. At 730, the difference(s) between the two profiles are determined. This determination is described in greater detail below.

Figure 8:
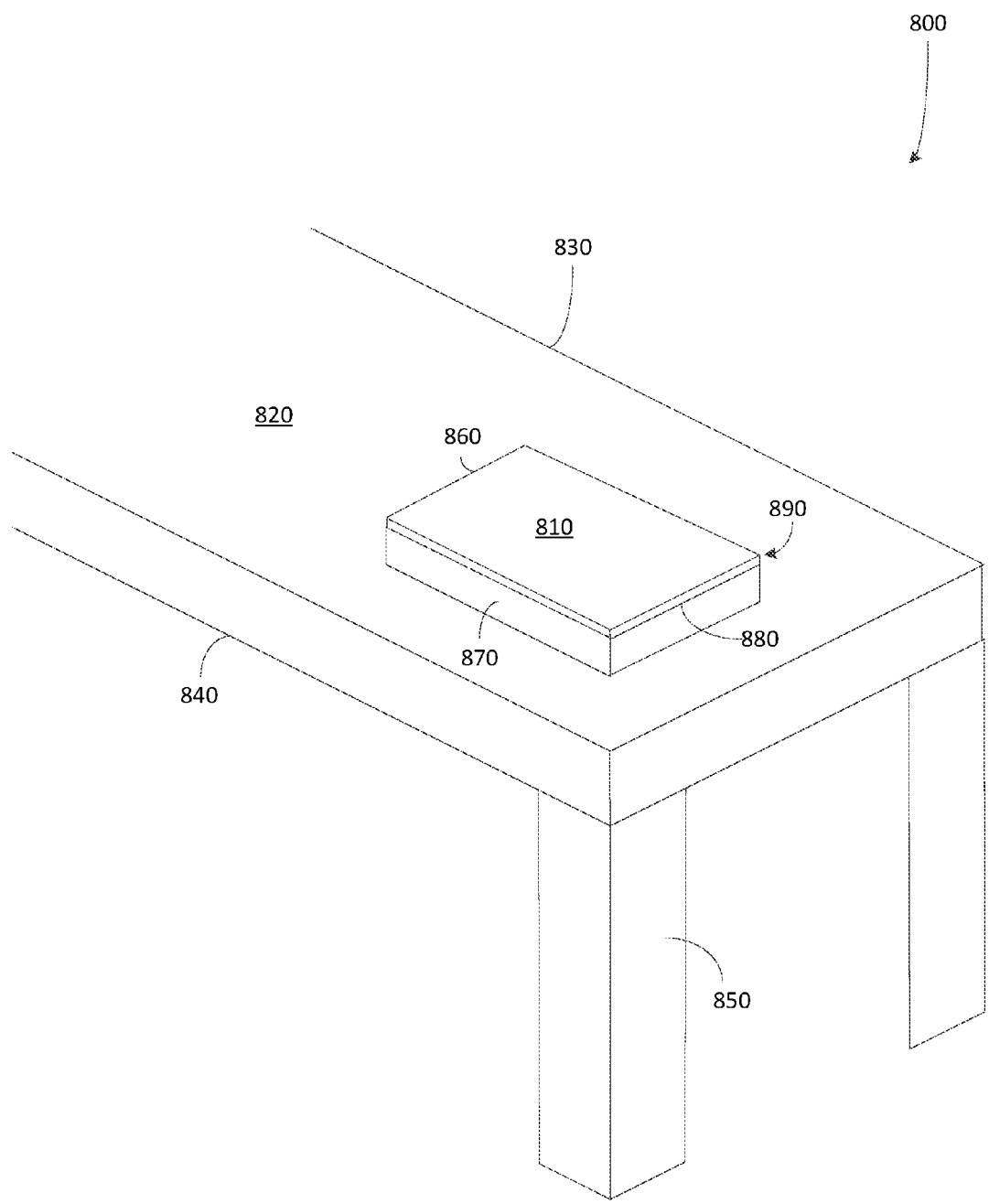
FIG. 8 is an example of an image that may be used as an image standard, according to an embodiment of the disclosed subject matter.
Figure 9:
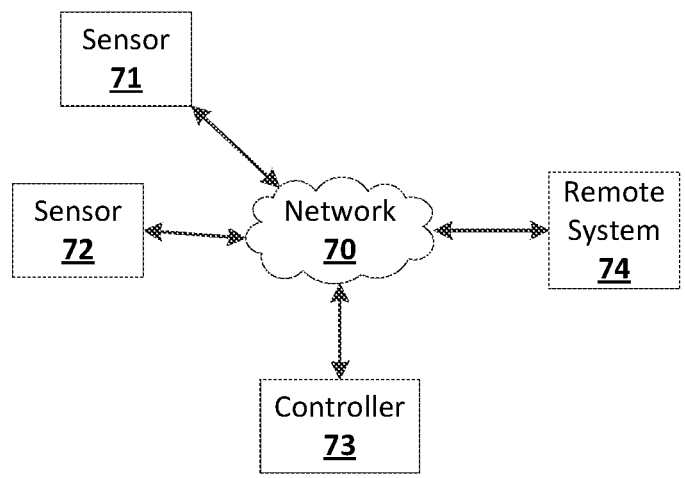
FIG. 9 illustrates a sensor network, according to an embodiment of the disclosed subject matter.

As discussed above, an image profile may identify particular features of an image and contain data regarding the features. Examples of features are shown in FIG. 8. FIG. 8 illustrates an example of an image standard; here, a laptop computer 810 is shown on a coffee table 820. The image includes edges 830 and 840 (here, edges of table 820) and a region 850. The image also includes edge 860, region 870, seam 880, and vertex 890, all related to laptop 810. The features shown in FIG. 9 are meant to be examples and are not meant to be comprehensive.

The profile for image 800 may include an identifier for each captured feature and one or more data elements for each feature. Data for edge 830 may include, for example, elements such as its location within image 800 (or its location relative to another feature), its shape, length, intensity and/or color. Region 850 may have associated data elements that include its size, shape, location, and color. Vertex 890 may have data elements that include its location, intensity, and color.

An image profile (whether for the image standard or for the operational image) may be implemented as a data structure in an implementation. The data structure may store an identifier for each feature, and the data elements pertaining to each feature. As suggested above, this information may include data elements such as the type, size, shape and/or location of the feature. Location may be represented by (x, y) coordinates, and may be relative to the overall image and/or relative to one or more other features. Other data elements may include intensity and color coordinate values of pixels of the feature. Comparison of two profiles may include comparison, feature by feature, of corresponding data elements. The comparison may determine, for example, whether corresponding vertices have the same values for their respective data elements, e.g., color and location. If two corresponding data elements differ, the numerical difference may be stored. In various embodiments, the comparison may use some subset of the data elements rather than all of them.

In an example scenario, image 800 may represent an image standard. One or more sensors (e.g., one or more cameras) may repeatedly image the scene operationally, perhaps twice per minute, although this frequency may differ with different implementations. While the laptop 810 remains in place, the images will not vary significantly from the image standard. Referring to FIG. 2, the loop of 220-240 will continue because the differences at 240 will not be significant (i.e., the differences are within defined thresholds). The state of the security system will not change at 250; for example, if the security system is disarmed, the system will remain in this state (260). Here, the continued presence of the laptop 810 suggests that the user is home and has not left for work, hence the security system remains disarmed. If the user leaves for work, however, he may take the laptop 810 with him. The next image captured by the sensor(s) will show the empty table 820, and the corresponding image profile will be very different from that of the image standard 800. These significant differences will cause the opposite outcome at 240, so that the state of the security system will be changed. In this scenario, the previously unarmed security system will become armed under the presumption that the user has left the home, given that the laptop has been removed from the scene.

While the user is away (and the laptop 810 is absent), the imaging of the scene (220 of FIG. 2) will continue. Differences in the profiles will continue to be detected (240), so that the arm state will persist (250). When the user returns, the laptop 810 will typically be returned to its usual spot on table 820. This operational image will be captured at 220, and at 240 it will be determined that the differences in the profiles of this operational image and the standard image are not significant. As a result, at 260 the security system will be disarmed under the presumption that the user has returned, given the presence of laptop 810.

In real world operation, there will be no guarantee that laptop 810 will always be placed/replaced at exactly the same spot on table 820 and in the same orientation as in the image standard 800. For that reason, it may be helpful to allow for some variation in the placement of laptop 810. In this way, placement of this object may be at a slight angle relative to the placement in the image standard 800, or at a slightly different position on table 820 for example, and the corresponding operational image will still be recognized as being sufficiently similar to the image standard 800. As a result, the user's placement of laptop 810 when returning home will still cause the security system to disarm.

The accommodation of this variability may be accomplished in any of several ways, including the use of fuzzy logic. First, as illustrated at 240 of FIG. 2, one or more thresholds may be defined, whereby some variation in profile differences is tolerated. Only when the difference(s) between the profiles of the operational image and the image standard exceed the threshold(s), and/or if enough such differences are found, will the system arm (or remain armed) at 250.

Determining a difference between two image profiles may be performed in any of several ways according to various embodiments. As noted above, a profile may be organized in a data structure that identifies various features and provides elements of data for each feature, such as the type, size, shape, color, and/or location of the feature. Given a profile for an image standard and a profile for an operational image of the same scene, corresponding data elements of corresponding features may be compared, so that differences may be calculated at the element level. An example may be the difference in the x-coordinates of the locations of vertex 890 (see FIG. 8) in the image standard versus the operational image. Another could be the difference in the corresponding y-coordinates. Another could be the difference in the value of the red coordinate for this vertex in the image standard versus the operational image, where colors of pixels are coded in a red/green/blue (RGB) color space. Analogously, other differences may be calculated based on differences between green or blue color coordinates. Similar differences could be calculated for other features, e.g., regions, edges, or pixels thereof.

In embodiments, an element-level difference may be compared to a corresponding element level threshold. If the difference exceeds the threshold, this condition may be flagged for that element. The outcome of determination 240 of FIG. 2 may then be based on the number of differences that exceed their respective thresholds. In an embodiment, the differences may be weighted, so that a difference that exceeds a threshold for one element may be more significant than a difference that exceeds a threshold for another element. For example, in an embodiment it may have been determined that differences in location are more significant than differences in color. Hence, a difference in the x-coordinate of a vertex may be treated as more significant that the difference in a green color coordinate for some other feature. This may be appropriate, for example, if it has been determined that lighting conditions may vary for various operational images, so that a feature's color difference is to be treated as less significant than a feature's location difference.

Another approach to accommodating the variability in operational images is to use more than one image standard. In this embodiment, two or more image standards would be created. The same scene may be captured with variations, e.g., the object (such as laptop 810) in different positions or orientations, or under different lighting conditions. In a process analogous to that of FIG. 2, a profile would be created for each of the standard images. The profile of the operational image would then be compared to each of the standard image profiles. If the operational image profile is sufficiently different from each of the image standard profiles, based on a threshold comparison process as described above, for example, then a home security system may be armed. Alternatively, in another embodiment, if the operational image profile is sufficiently different from some predefined number of the image standard profiles, based on a threshold comparison process as described above, then a home security system may be armed.

In another embodiment, the different image standards may be created with different respective cameras; multiple operational images may also be created with the different respective cameras. In such an embodiment, any of the above comparison processes may be performed across some or all combinations of the image standards and operational images.

In another embodiment, the training may include the capture of an image standard where the object is absent. In the example of FIG. 8, the image standard would include table 820 without laptop 810. If an operational image is then captured such that its profile is sufficiently different from the profile of the image standard, then the security system would disarm (or remain in the disarmed state). This would be the case, for example, when the user places the laptop on table 820. The placement of the laptop would suggest that the user is home, so that the security system need not be armed. Note that in this embodiment, the user may place any object on the table 820 that would lead to an operational image profile that differs significantly from that of the image standard. Thus, any such object placed on table 820 would effectively disarm the security system. Conversely, when an operational image has a profile similar to that of the image standard in this case (i.e., an operational image of the empty table 820), then the security system can be placed (or can remain) in an armed state. In this latter scenario, the empty table suggests that the user is not home or is no longer home, so that it is appropriate for the security system to be in an armed state.

Some or all of the components described herein may be implemented in a networked environment. Sensors or cameras as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 9 shows an example of a sensor network, for example, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 9 may be an example of a smart-home environment. The depicted smart-home environment may include any structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors or cameras 71, 72, may be mounted on, integrated with and/or supported by a wall, floor, or ceiling of the structure.

The smart-home environment including the sensor network shown in FIG. 9 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 9.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 9, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 9, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 9 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 9. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 9. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 9 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 9 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 9 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 10:
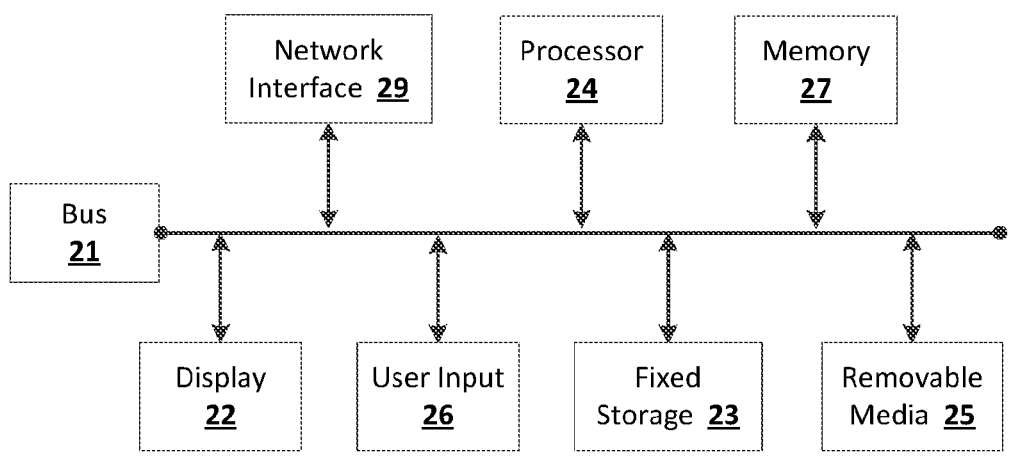
FIG. 10 is a block diagram of a computing system that may used in an embodiment of the disclosed subject matter.

Embodiments of the presently disclosed subject matter may be implemented in and used with a variety of computing devices. FIG. 10 is an example computing device 20 suitable for implementing embodiments of the presently disclosed subject matter, e.g., the processing described above with respect to FIGS. 2-7. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 11:
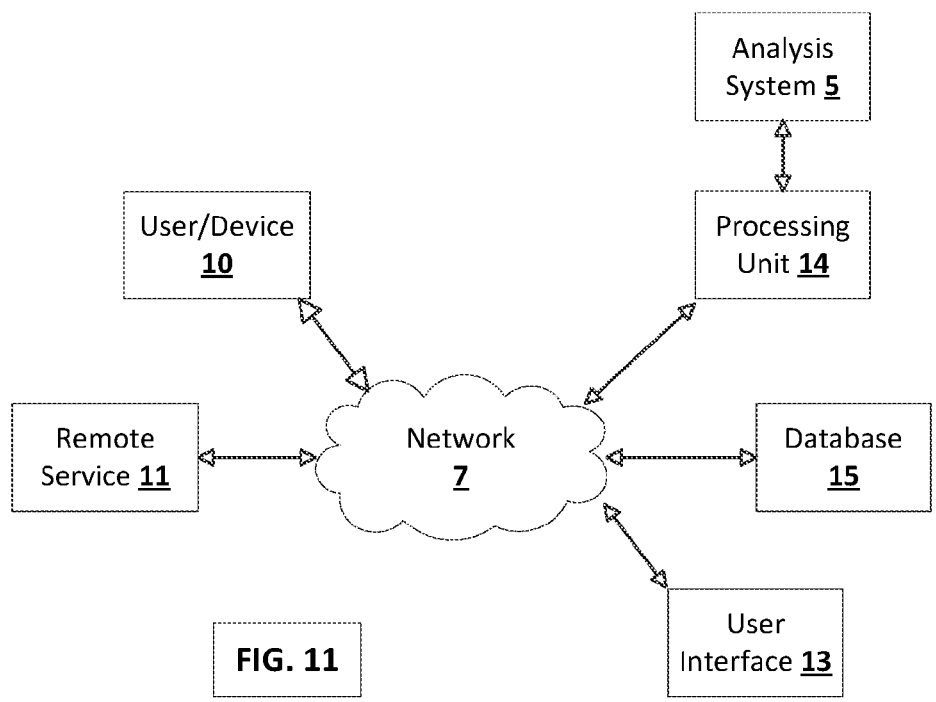
FIG. 11 is a block diagram of a network context of an embodiment of the disclosed subject matter.

FIG. 11 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
 training a processor to recognize an image standard for an object within a scene, wherein the training comprises creating a profile of the image standard;
 performing operational imaging of the scene including the object to create an operational image;
 creating a profile of the operational image;
 comparing the profiles of the image standard and the operational image;
 changing a state of a security system as a result of a comparison of the profiles of the image standard and the operational image such that the security system is placed in an armed state when the object in the standard image is in a first position and the object in the operational image is in a second position, wherein the first position and the second position are different positions relative to one another, and the security system is placed in a disarmed state when the object in both the standard image and the operational image is in the first position.

2. The method of claim 1, wherein the training comprises:
 acquiring the image standard of the scene;
 performing pre-processing of the image standard;
 performing feature extraction on the pre-processed image standard;
 performing segmentation of the extracted features of the pre-processed image standard; and
 creating the profile of the image standard based on the segmented extracted features.

3. The method of claim 2, wherein each of the profile of the image standard and the profile of the operational image comprises identifications of extracted features from the respective image standard and the operational image.

4. The method of claim 3, wherein each of the profile of the image standard and the profile of the operational image comprises data relating to each feature in the respective image standard and the operational image, wherein the data relates to one or more of:
 feature type, feature size,
feature location, and
feature color.

5. The method of claim 1, wherein the comparing of the profiles comprises:
comparing data in the profile of the image standard with corresponding data in the profile of the operational image to determine if one or more resulting differences exceeds one or more corresponding respective threshold values.

6. The method of claim 5, wherein the state of the security system is changed when at least one of the resulting differences exceeds at least one of the corresponding respective threshold values.

7. The method of claim 1, wherein the comparing of the profiles comprises an application of fuzzy logic to determine one or more resulting differences.

8. The method of claim 1, wherein the changing of the state of the security system comprises one of setting an alarm, resetting the alarm, and asserting the alarm.

9. The method of claim 1, wherein the image standard includes an image of an object that is not present in the operational image.

10. The method of claim 1, wherein the operational image includes an image of an object that is not present in the image standard.

11. A system comprising:
a processor; and
a memory in communication with the processor, wherein the memory stores instructions that, when executed by the processor, cause the processor to:
training a processor to recognize an object within an image standard for a scene, wherein the training comprises creating a profile of the image standard;
performing operational imaging of the scene including the object to create an operational image;
creating a profile of the operational image;
comparing the profiles of the image standard and the operational image; and
changing a state of a security system as a result of a comparison of the profiles of the image standard and the operational image such that the security system is placed in an armed state when the object in the standard image is in a first position and the object in the operational image is in a second position, wherein the first position and the second position are different positions relative to one another, and the security system is placed in a disarmed state when the object in both the standard image and the operational image is in the first position.

12. The system of claim 11, wherein the training comprises:
acquiring the image standard of the scene;
performing pre-processing of the image standard;
performing feature extraction on the pre-processed image standard;
performing segmentation of the extracted features of the pre-processed image standard; and
creating the profile of the image standard based on the segmented extracted features.

13. The system of claim 12, wherein each of the profile of the image standard and the profile of the operational image comprises identifications of extracted features from the respective image standard and the operational image.

14. The system of claim 13, wherein each of the profile of the image standard and the profile of the operational image comprises data relating to each feature in the respective image standard and the operational image, wherein the data relates to one or more of:
feature type,
feature size,
feature location, and
feature color.

15. The system of claim 11, wherein the comparing of the profiles comprises:
comparing data in the profile of the image standard with corresponding data in the profile of the operational image to determine if one or more resulting differences exceeds one or more corresponding respective threshold values.

16. The system of claim 15, wherein the state of the security system is changed when at least one of the resulting differences exceeds at least one of the corresponding respective threshold values.

17. The system of claim 11, wherein the comparing of the profiles comprises an application of fuzzy logic to determine one or more resulting differences.

18. The system of claim 11, wherein the changing of the state of the security system comprises one of setting an alarm, resetting the alarm, and asserting the alarm.

19. The system of claim 11, wherein the image standard includes an image of an object that is not present in the operational image.

20. The system of claim 11, wherein the operational image includes an image of an object that is not present in the image standard.

* * * * *